(12) United States Patent
Lee et al.

(10) Patent No.: US 11,205,048 B2
(45) Date of Patent: Dec. 21, 2021

(54) CONTEXTUAL DISAMBIGUATION OF AN ENTITY IN A CONVERSATION MANAGEMENT SYSTEM

(71) Applicant: International Business Machines Corporation, Armonk, NY (US)

(72) Inventors: Sunhwan Lee, San Mateo, CA (US);
Shun Jiang, San Jose, CA (US);
Chung-hao Tan, San Jose, CA (US);
Lei Huang, Mountain View, CA (US);
Pawan Chowdhary, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 161 days.

(21) Appl. No.: 16/444,801

(22) Filed: Jun. 18, 2019

(65) Prior Publication Data

US 2020/0401659 A1    Dec. 24, 2020

(51) Int. Cl.
*G06F 40/295*    (2020.01)
*G06N 20/00*    (2019.01)
*G06F 40/30*    (2020.01)

(52) U.S. Cl.
CPC ............ *G06F 40/295* (2020.01); *G06F 40/30* (2020.01); *G06N 20/00* (2019.01)

(58) Field of Classification Search
CPC ........ G06F 40/295; G06F 40/30; G06N 20/00
See application file for complete search history.

(56) References Cited

U.S. PATENT DOCUMENTS

| 9,922,650 B1 | 3/2018 | Secker-Walker et al. |
| 10,073,673 B2 | 9/2018 | Brancovici et al. |

(Continued)

FOREIGN PATENT DOCUMENTS

| AU | 2018100384 A4 | 5/2018 |
| EP | 3243201 A1 | 11/2017 |
| WO | 2016112055 A1 | 7/2016 |

OTHER PUBLICATIONS https://markets.businessinsider.com/news/stocks/chatbot-market-size-to-reach-1-25-billion-by-2025-cagr-24-3-grand-view-research-inc-1002381903, Chatbot Market Size to Reach $1.25 Billion by 2025 | CAGR: 24.3%: Grand View Research, Inc., Last Accessed May 1, 2019, 7 Pages.

(Continued)

*Primary Examiner* — Pierre Louis Desir
*Assistant Examiner* — Nicole A K Schmieder
(74) *Attorney, Agent, or Firm* — Amin, Turocy & Watson, LLP

(57) ABSTRACT

Systems, computer-implemented methods, and computer program products that can facilitate word entity disambiguation are provided. According to an embodiment, a system can comprise a memory that stores computer executable components and a processor that executes the computer executable components stored in the memory. The computer executable components can comprise a language model component that employs an artificial intelligence model to generate a profile vector of an entity based on one or more binary values representing profile data of the entity and a word vector of a word entity in a dialogue based on one or more second word entities adjacent to the word entity in the dialogue. The computer executable components can further comprise a dialogue management component that disambiguates the word entity based on the profile vector and the word vector.

20 Claims, 10 Drawing Sheets

(56) References Cited

U.S. PATENT DOCUMENTS

| | | | |
|---|---|---|---|
| 2014/0040274 A1 | 2/2014 | Aravamudan et al. | |
| 2014/0237355 A1 | 8/2014 | Bufe et al. | |
| 2014/0279906 A1 | 9/2014 | Peintner | |
| 2017/0017719 A1 | 1/2017 | Aravamudan et al. | |
| 2017/0193390 A1* | 7/2017 | Weston | G06N 3/08 |
| 2018/0032503 A1 | 2/2018 | Swart et al. | |
| 2018/0060301 A1 | 3/2018 | Li et al. | |
| 2018/0285774 A1* | 10/2018 | Soni | G06Q 50/01 |
| 2018/0349377 A1* | 12/2018 | Verma | G06F 16/248 |
| 2020/0104361 A1* | 4/2020 | Zarrella | G06N 20/00 |

OTHER PUBLICATIONS

Kloeckner, et al., Conversational IT Service Management, Transforming the IT Services Lifecycle with AI Technologies, 2018, pp. 75-93.

Liao, et al, Tailoring Conversational UX through the Lens of Dialogue Complexity, CHI Workshop on Conversational UX Design, 2017, 5 Pages.

Anonymous, et al., Disambiguation of entity references using related entities, Mar. 29, 2018, 7 Pages.

Mel, et al., The NIST Definition of Cloud Computing, National Institute of Standards and Technology Special Publication 800-145, Sep. 2011, 7 Pages.

* cited by examiner

US 11,205,048 B2

CONTEXTUAL DISAMBIGUATION OF AN ENTITY IN A CONVERSATION MANAGEMENT SYSTEM

BACKGROUND

The subject disclosure relates to word entity disambiguation, and more specifically, contextual disambiguation of a word entity in a conversation management system.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that can facilitate word entity disambiguation are described.

According to an embodiment, a system can comprise a memory that stores computer executable components and a processor that executes the computer executable components stored in the memory. The computer executable components can comprise a language model component that employs an artificial intelligence model to generate a profile vector of an entity based on one or more binary values representing profile data of the entity and a word vector of a word entity in a dialogue based on one or more second word entities adjacent to the word entity in the dialogue. The computer executable components can further comprise a dialogue management component that disambiguates the word entity based on the profile vector and the word vector.

According to another embodiment, a computer-implemented method can comprise employing, by a system operatively coupled to a processor, an artificial intelligence model to generate a profile vector of an entity based on one or more binary values representing profile data of the entity and a word vector of a word entity in a dialogue based on one or more second word entities adjacent to the word entity in the dialogue. The computer-implemented method can further comprise disambiguating, by the system, the word entity based on the profile vector and the word vector.

According to another embodiment, a computer program product facilitating word entity disambiguation is provided. The computer program product comprising a computer readable storage medium having program instructions embodied therewith, the program instructions executable by a processor to cause the processor to employ, by the processor, an artificial intelligence model to generate a profile vector of an entity based on one or more binary values representing profile data of the entity and a word vector of a word entity in a dialogue based on one or more second word entities adjacent to the word entity in the dialogue. The program instructions are further executable by the processor to cause the processor to disambiguate, by the processor, the word entity based on the profile vector and the word vector.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

There are many different ways of expressing (e.g., defining) an entity in natural language and variations (e.g., alternative interpretations) of such an entity can be mapped to multiple different entities in, for example, a conversation agent. Currently, conversation analysts who manage a dialogue system manually define such variations of entities to their best knowledge, which can be incomplete and not scalable.

Figure 1:
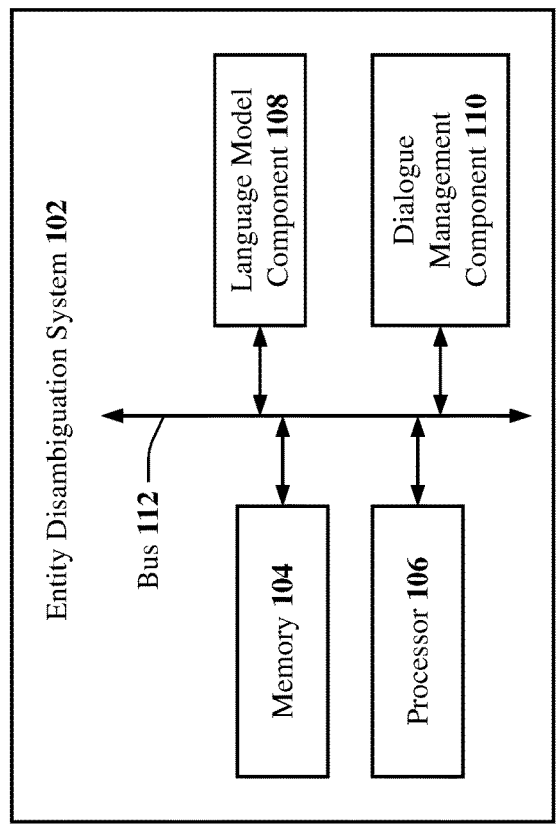
FIG. 1 illustrates a block diagram of an example, non-limiting system that can facilitate word entity disambiguation in accordance with one or more embodiments described herein.

FIG. 1 illustrates a block diagram of an example, non-limiting system 100 that can facilitate word entity disambiguation in accordance with one or more embodiments described herein. In some embodiments, system 100 can comprise an entity disambiguation system 102. In some embodiments, entity disambiguation system 102 can be associated with a cloud computing environment. For example, entity disambiguation system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1, according to several embodiments, system 100 can comprise entity disambiguation system 102. In some embodiments, entity disambiguation system 102 can comprise a memory 104, a processor 106, a language model component 108, a dialogue management component 110, and/or a bus 112.

It should be appreciated that the embodiments of the subject disclosure depicted in various figures disclosed herein are for illustration only, and as such, the architecture of such embodiments are not limited to the systems, devices, or components depicted therein. For example, in some embodiments, system 100 and/or entity disambiguation system 102 can further comprise various computer or computing-based elements described herein with reference to operating environment 800 and FIG. 8. In several embodiments, such computer and/or computing-based elements can be used in connection with implementing one or more of the systems, devices, components, or computer-implemented operations shown and described in connection with FIG. 1 or other figures disclosed herein.

According to multiple embodiments, memory 104 can store one or more computer or machine readable, writable, or executable components or instructions that, when executed by processor 106, can facilitate performance of operations defined by the executable component(s) or instruction(s). For example, memory 104 can store computer or machine readable, writable, or executable components or instructions that, when executed by processor 106, can facilitate execution of the various functions described herein relating to entity disambiguation system 102, language model component 108, dialogue management component 110, and/or another component associated with entity disambiguation system 102, as described herein with or without reference to the various figures of the subject disclosure.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

According to multiple embodiments, processor 106 can comprise one or more types of processors or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor. Further examples of processor 106 are described below with reference to processing unit 814 and FIG. 8. Such examples of processor 106 can be employed to implement any embodiments of the subject disclosure.

In some embodiments, entity disambiguation system 102, memory 104, processor 106, language model component 108, dialogue management component 110, and/or another component of entity disambiguation system 102 as described herein can be communicatively, electrically, and/or operatively coupled to one another via a bus 112 to perform functions of system 100, entity disambiguation system 102, and/or any components coupled therewith. In several embodiments, bus 112 can comprise one or more memory bus, memory controller, peripheral bus, external bus, local bus, and/or another type of bus that can employ various bus architectures. Further examples of bus 112 are described below with reference to system bus 818 and FIG. 8. Such examples of bus 112 can be employed to implement any embodiments of the subject disclosure.

According to multiple embodiments, entity disambiguation system 102 can comprise any type of component, machine, device, facility, apparatus, and/or instrument that comprises a processor and/or can be capable of effective and/or operative communication with a wired and/or wireless network. All such embodiments are envisioned. For example, entity disambiguation system 102 can comprise a server device, a computing device, a general-purpose computer, a special-purpose computer, a quantum computing device (e.g., a quantum computer, a quantum processor, etc.), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, entity disambiguation system 102 can be coupled (e.g., communicatively, electrically, operatively, etc.) to one or more external systems, sources, and/or devices (e.g., computing devices, communication devices, etc.) via a data cable (e.g., High-Definition Multimedia Interface (HDMI), recommended standard (RS) 232, Ethernet cable, etc.). In some embodiments, entity disambiguation system 102 can be coupled (e.g., communicatively, electrically, operatively, etc.) to one or more external systems, sources, and/or devices (e.g., computing devices, communication devices, etc.) via a network.

According to multiple embodiments, such a network can comprise wired and/or wireless networks, including, but not limited to, a cellular network, a wide area network (WAN) (e.g., the Internet), and/or a local area network (LAN). For example, entity disambiguation system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, entity disambiguation system 102 can thus include hardware (e.g., a central processing unit (CPU), a transceiver, a decoder), software (e.g., a set of threads, a set of processes, software in execution) and/or a combination of hardware and software that facilitates communicating information between entity disambiguation system 102 and external systems, sources, and/or devices (e.g., computing devices, communication devices, etc.).

In some embodiments, entity disambiguation system 102 can comprise one or more computer and/or machine readable, writable, and/or executable components and/or instructions that, when executed by processor 106, can facilitate performance of operations defined by such component(s) and/or instruction(s). Further, in some embodiments, any component associated with entity disambiguation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, language model component 108, dialogue management component 110, and/or any other components associated with entity disambiguation system 102 as disclosed herein (e.g., communicatively, electronically, and/or operatively coupled with or employed by entity disambiguation system 102), can comprise such computer and/or machine readable, writable, and/or executable component(s) and/or instruction(s). Consequently, in some embodiments, entity disambiguation system 102 and/or any components associated therewith as disclosed herein, can employ processor 106 to execute such computer and/or machine readable, writable, and/or executable component(s) and/or instruction(s) to facilitate performance of one or more operations described herein with reference to entity disambiguation system 102 and/or any such components associated therewith.

In some embodiments, entity disambiguation system 102 can facilitate performance of operations executed by and/or associated with language model component 108, dialogue management component 110, and/or another component associated with entity disambiguation system 102 as disclosed herein. For example, as described in detail below, entity disambiguation system 102 can facilitate (e.g., via processor 106): employing an artificial intelligence model to generate a profile vector of an entity based on one or more binary values representing profile data of the entity and a word vector of a word entity in a dialogue based on one or more second word entities adjacent to the word entity in the dialogue; and/or disambiguating the word entity based on the profile vector and the word vector.

In some embodiments, entity disambiguation system 102 can further facilitate (e.g., via processor 106): collecting at least one of the profile data of the entity or one or more conversation logs comprising at least one of the dialogue, the word entity, or the one or more second word entities; disambiguating the word entity based on at least one of a distance between the profile vector and the word vector or distances between the profile vector and multiple word vectors; employing at least one of a language model, a document to vector model, a word to vector model, a natural language model, a term vector model, a vector space model, a natural language processing model, a statistical language model, or a feature learning model to generate the profile vector of the entity based on the one or more binary values representing the profile data of the entity and the word vector of the word entity in the dialogue based on the one or more second word entities adjacent to the word entity in the dialogue; presenting at least one of a word entity variation or a word entity disambiguation of the word entity; receiving feedback data corresponding to at least one of the word entity variation or the word entity disambiguation; and/or learning one or more word entity variations of the word entity based on feedback data corresponding to at least one of a word entity variation or a word entity disambiguation of the word entity.

According to multiple embodiments, language model component 108 can employ one or more artificial intelligence (AI) models to generate a profile vector of an entity based on one or more binary values representing profile data of the entity and a word vector of a word entity in a dialogue based on one or more second word entities adjacent to the word entity in the dialogue. For example, language model component 108 can employ one or more AI models to generate a profile vector of an entity such as, for instance, a human based on one or more binary values representing profile data of the entity and a word vector of a target word entity (e.g., an n-gram word entity having multiple meanings, requiring disambiguation) in a dialogue based on one or more contextual word entities adjacent to the target word entity in the dialogue (e.g., a conversation between a human and a conversation agent). In some embodiments, to generate such a profile vector of an entity and such a word vector of a word entity described above, language model component 108 can employ one or more AI models including, but not limited to, a language model, a document to vector model, a word to vector model, a natural language model, a term vector model, a vector space model, a natural language processing model, a statistical language model, a feature learning model, and/or another AI model.

In some embodiments, language model component 108 can employ one or more of the AI models defined above to generate a profile vector of an entity based on one or more binary values representing profile data of the entity, where such profile data of the entity can include, but is not limited to, entity age, entity country of residence, and/or other profile data of the entity. For example, each data item of profile data (e.g., age, country of residence, etc.) corresponding to an entity (e.g., a human) can be assigned (e.g., via language model component 108) a numerical value of zero (0) or one (1), depending on whether such a data item satisfies certain defined criteria. For instance, if an entity (e.g., a human) resides in a certain defined country, then an entity country of residence data item can be assigned a numerical value of zero (0) and if such an entity does not reside in such a certain defined country, then the entity country of residence data item can be assigned a numerical value of one (1). In some embodiments, such profile data of the entity can be collected using data collection component 302, for instance, as described below with reference to FIG. 3.

In some embodiments, language model component 108 can employ one or more of the AI models defined above to generate a word vector of a word entity in a dialogue based on one or more second word entities (e.g., one or more contextual word entities) adjacent to the word entity in the dialogue, where such word entity and/or such one or more second word entities can comprise one or more textual objects that can include, but are not limited to, a phoneme, a syllable, a letter, a word, a sentence, a paragraph, and/or another textual object. In some embodiments, such a dialogue can include, but is not limited to, a sequence of word entities, a sequence of textual objects, a textual dialogue, a textual conversation, a corpus of conversation log data, and/or another type of dialogue. For example, such a dialogue can comprise a conversation between an entity (e.g., a human) and dialogue system such as, for instance, a conversation agent (also referred to as a conversational agent).

In some embodiments, to facilitate generation of such a profile vector and such a word vector described above, language model component 108 can employ and/or modify one or more of the AI models defined above to perform profile embedding and word embedding. In some embodiments, such profile embedding can facilitate generation of such a profile vector and such word embedding can facilitate generation of such a word vector. In some embodiments, embedding of a target word entity (e.g., a word entity having multiple meanings that requires disambiguation) and embedding of profile data corresponding to an entity participating in a dialogue can be obtained by minimizing the loss function between the output (e.g., embedding, vector, etc.) of the model (e.g., entity disambiguation system 102, language model component 108, dialogue management component 110, and/or model 200) and the representation of a target word entity (e.g., embedding of such a target word entity, vector representation of the target word entity, etc.).

In some embodiments, to facilitate generation of such a profile vector and such a word vector described above, language model component 108 can employ and/or modify a document to vector AI model and/or a word to vector AI model to perform profile embedding and word embedding. For example, to facilitate generation of such a profile vector and such a word vector described above, language model component 108 can employ and/or modify a document to vector AI model and/or a word to vector AI model to generate model 200 illustrated in FIG. 2, which can facilitate profile embedding and word embedding as described below. In some embodiments, language model component 108 can employ model 200 to generate a profile vector of an entity (e.g., a human) based on one or more binary values (e.g., 0 or 1) representing profile data of the entity (e.g., age, country of residency, etc.) and a word vector of a word entity in a dialogue based on one or more second word entities adjacent to the word entity in the dialogue (e.g., one or more contextual word entities adjacent to a target word entity in a dialogue).

Figure 2:
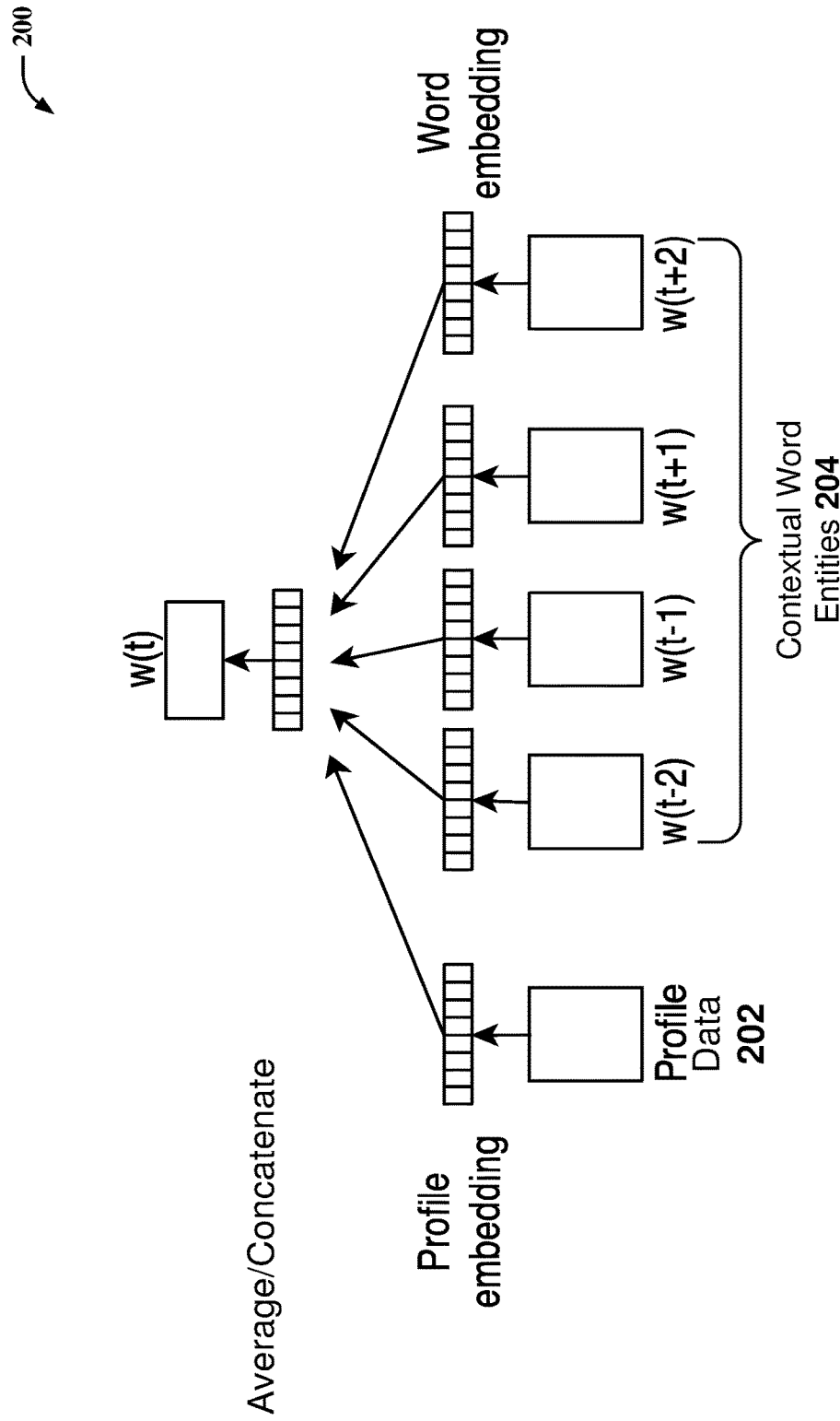
FIG. 2 illustrates an example, non-limiting model that can facilitate word entity disambiguation in accordance with one or more embodiments described herein.

FIG. 2 illustrates an example, non-limiting model 200 that can facilitate word entity disambiguation in accordance with one or more embodiments described herein. Repetitive description of like elements and/or processes employed in respective embodiments is omitted for sake of brevity.

According to multiple embodiments, model 200 can comprise an alternative version (e.g., a modified version) of a document to vector model and/or a word to vector model. In some embodiments, model 200 can execute one or more operations based on input data including, but not limited to, profile data 202, one or more contextual word entities 204, and/or other input data. In some embodiments (not illustrated in the figures), a conversation profile can be used as input by model 200 to further facilitate disambiguation of a word entity (e.g., a target word entity) used by an entity (e.g., a human) in a dialogue (e.g., a conversation between a human and a conversation agent).

In some embodiments, profile data 202 can comprise one or more binary values representing one or more attributes of profile data corresponding to an entity participating in a dialogue. For example, profile data 202 can comprise one or more binary values (e.g., 0 or 1) representing one or more attributes of profile data including, but not limited to, entity age, entity country of residency, and/or another attribute of profile data corresponding to an entity such as, for instance, a human participating in, for instance, a conversation between a human and a conversation agent.

In some embodiments, contextual word entities 204 can comprise contextual word entities located a certain number of positions (e.g., t−n positions and/or t+n positions) to the left and/or to the right of a word entity (e.g., a target word entity) used by an entity (e.g., a human) in a dialogue. For example: contextual word entity 204 denoted as w(t−2) in FIG. 2 can comprise a contextual word entity located two (2) positions to the left of a target word entity in a dialogue; contextual word entity 204 denoted as w(t−1) in FIG. 2 can comprise a contextual word entity located one (1) position to the left of a target word entity in a dialogue; contextual word entity 204 denoted as w(t+1) in FIG. 2 can comprise a contextual word entity located one (1) position to the right of a target word entity in a dialogue; and/or contextual word entity 204 denoted as w(t+2) in FIG. 2 can comprise a contextual word entity located two (2) positions to the right of a target word entity in a dialogue.

In some embodiments, such a certain number of positions (e.g., t−n positions and/or t+n positions) corresponding to contextual word entities 204 (e.g., denoted as w(t−2), w(t−1), w(t+1), and w(t+2) in FIG. 2), can be defined by an entity (e.g., a human, entity disambiguation system 102, language model component 108, learner component 502, etc.). For example, such a certain number of positions (e.g., t−n positions and/or t+n positions) can be defined by an entity (e.g., a human) using interface component 402 described below with reference to FIG. 4. In some embodiments, such definition by an entity can constitute defining a number of contextual word entities 204 (e.g., n number of adjacent word entities) that can be utilized by model 200 to generate the word vector of a word entity (e.g., a target word entity) as described above.

In some embodiments, model 200 can output (e.g., generate) a numerical representation (e.g., denoted as w(t) in FIG. 2) of a predicted target word entity w at position t in a dialogue, where t=0. For example, model 200 can output a vector representation of a predicted target word entity w at position t in a dialogue, where t=0. In some embodiments, model 200 can output (e.g., generate) one or more vector representations of profile data 202 and contextual word entities 204. For example, model 200 can output (e.g., generate) a profile vector representation of profile data 202, a word vector representation of contextual word entities 204, and/or a combined vector representation of both profile data 202 and contextual word entities 204 combined. In some embodiments, to generate such a profile vector, word vector, and/or combined vector described above, model 200 can perform profile embedding and/or word embedding (e.g., as described below) based on averaging and/or concatenating each attribute corresponding to profile data 202 and/or contextual word entities 204.

In some embodiments, model 200 can generate a profile vector of an entity based on one or more binary values representing profile data of an entity participating in a dialogue. For example, model 200 can generate such a profile vector of an entity by performing profile embedding based on one or more binary values representing profile data of the entity. For instance, model 200 can generate such a profile vector of an entity by performing profile embedding based on profile data 202 illustrated in FIG. 2, where such profile data 202 can comprise one or more binary values (e.g., 0 or 1) representing one or more attributes of profile data (e.g., age, country of residency, etc.) corresponding to an entity (e.g., a human) participating in a dialogue (e.g., a conversation between the entity and a conversation agent).

In some embodiments, model 200 can generate a word vector of a word entity in a dialogue based on one or more contextual word entities adjacent to the word entity in the dialogue. For example, model 200 can generate such a word vector of a word entity (e.g., a target word entity) in a dialogue by performing word embedding based on one or more contextual word entities adjacent to the word entity in the dialogue. For instance, model 200 can generate such a word vector of a target word entity in a dialogue by performing word embedding based on one or more contextual word entities 204 (e.g., denoted as w(t−2), w(t−1), w(t+1), and w(t+2) in FIG. 2).

In some embodiments, model 200 can predict (e.g., output) a numerical representation such as, for example, a vector representation of a target word entity, where such a predicted vector representation of the target word entity can comprise a prediction of a disambiguated word entity. In some embodiments, model 200 can output a numerical representation (e.g., a vector representation) of profile data 202 and a numerical representation (e.g., a vector representation) of a target word entity, as model 200 can output the profile embedding of profile data 202 and the word embedding of contextual word entities 204.

In some embodiments, model 200 can output (e.g., generate) a mathematical function that can describe one or more mathematical relationships between multiple vectors (e.g., closely related, moderately related, distantly related, etc.). For example, model 200 can output the function denoted as $f$ (entity, word) at operation 606 illustrated in FIG. 6 that can describe such one or more relationships between multiple vectors by comparing one or more distances between vectors including, but not limited to: a profile vector representing profile data 202; a word vector representing contextual word entities 204; a combined vector representing profile data 202 and contextual word entities 204; and/or a vector representing a word entity variation that can be defined in a database (e.g., an index) of dialogue management component 110 (e.g., as described below). In some embodiments, language model component 108, dialogue management component 110, and/or model 200 can employ such a function $f$ (entity, word) to disambiguate a word entity used by an entity (e.g., a human) in a dialogue based on a distance measured between one or more of the vectors defined above. For example, such components defined above can employ function $f$ (entity, word) to disambiguate a word entity having multiple meanings by determining which word entity variation defined in a database of dialogue management component 110 the entity intends to reference by using such a word entity in the dialogue.

In some embodiments, to facilitate such disambiguation, function $f$ (entity, word) can be applied to calculate the cosine distance between at least two (2) vectors. For example, function $f$ (entity, word) can be applied (e.g., by language model component 108, dialogue management component 110, and/or model 200) to calculate a cosine distance between multiple vectors, where such a cosine distance can be equal to one (1) minus cosine similarity (e.g., cosine distance=1−cosine similarity). In some embodiments, a relatively short cosine distance between multiple vectors, as calculated using function $f$ (entity, word), can constitute a relatively strong (e.g., close) relationship between the measured vectors, whereas a relatively long cosine distance between multiple vectors, as calculated using function $f$ (entity, word), can constitute a relatively weak (e.g., distant) relationship between the measured vectors.

Returning to FIG. 1, according to multiple embodiments, dialogue management component 110 can disambiguate a word entity based on a profile vector and a word vector. For example, dialogue management component 110 can employ the function $f$ (entity, word) described above to disambiguate a word entity used by an entity (e.g., a human) in a dialogue based on a profile vector and a word vector generated by model 200 using profile embedding and word embedding, respectively, as described above with reference to FIG. 2.

In some embodiments, dialogue management component 110 can comprise a database (e.g., an index) comprising one or more word entity categories (e.g., one or more word entity classifications). For example, dialogue management component 110 can comprise a database comprising a word entity category defined as "city," where such a word entity category can comprise one or more word entity variations of a word entity categorized as "city," where such word entity variation(s) can correspond to one or more meanings (e.g., definitions) of such a word entity categorized as "city". For instance, dialogue management component 110 can comprise multiple word entity variations of a word entity defined as "London" in a word entity category defined as "city," where each of such word entity variations can correspond to a different meaning (e.g., definition) of the word entity defined as "London". For example, dialogue management component 110 can comprise word entity variations of the word entity defined as "London" that correspond respectively to the city of London in England, the city of London in the United States of America, and/or the city of London in another country. In some embodiments, such word entity variations can have a vector representation assigned thereto (e.g., assigned by dialogue management component 110).

In some embodiments, dialogue management component 110 can disambiguate a word entity based on at least one of a distance between a profile vector and a word vector or distances between the profile vector and multiple word vectors. For example, to disambiguate a word entity used by an entity in a dialogue, dialogue management component 110 can employ the function $f$ (entity, word) to calculate the distance (e.g., cosine distance) between a profile embedding (e.g., a profile vector) of profile data 202 described above with reference to FIG. 2 and one or more other embeddings (e.g., one or more other vector representations of data). For instance, to disambiguate a word entity used by an entity in a dialogue, dialogue management component 110 can employ the function $f$ (entity, word) to calculate the distance (e.g., cosine distance) between a profile embedding (e.g., a profile vector) of profile data 202 described above with reference to FIG. 2 and one or more other embeddings including, but not limited to: a word embedding (e.g., a word vector) of contextual word entities 204; a combined embedding (e.g., a combined vector comprising the profile vector and the word vector described above); a word entity variation embedding (e.g., a word entity variation vector) of a word entity variation defined in a database of dialogue management component 110; and/or another embedding.

In some embodiments, to disambiguate a word entity used by an entity in a dialogue, dialogue management component 110 can employ the function $f$ (entity, word) to calculate the distance (e.g., cosine distance) between a profile embedding comprising the profile vector of profile data 202 described above with reference to FIG. 2 and one or more word entity variation embeddings (e.g., word entity variation vector(s)) of one or more word entity variations defined in a database of dialogue management component 110. In some embodiments, to disambiguate a word entity used by an entity in a dialogue, dialogue management component 110 can employ the function $f$ (entity, word) to calculate the distance (e.g., cosine distance) between such one or more word entity variation embeddings (e.g., word entity variation vector(s)) and a profile embedding comprising a combined embedding (e.g., a combined vector comprising the profile vector of profile data 202 and the word vector of contextual word entities 204).

In some embodiments, dialogue management component 110 can output one or more word entity variations of a word entity that dialogue management component 110 identifies as needing disambiguation. For instance, dialogue management component 110 can detect that a word entity defined as "Windy city" and used by an entity (e.g., a human) in a dialogue (e.g., a conversation between a human and a conversation agent) is mapped (e.g., in a database of dialogue management component 110) to a first word entity variation defined as "Chicago" in the United States of America and is also mapped to a second word entity variation defined as "Hsinchu" in Taiwan. In this example, to disambiguate "Windy city," dialogue management component 110 can employ the function $f$ (entity, word) to calculate the distance (e.g., cosine distance) between a profile embedding (e.g., a profile vector) of profile data 202 described above with reference to FIG. 2 and word entity variation embeddings (e.g., word entity vectors) of the first and second word entity variations defined above, "Chicago" and "Hsinchu." In this example, dialogue management component 110 can disambiguate "Windy city" by selecting the word entity variation embedding (e.g., word entity variation vector) of "Chicago" or "Hsinchu" having, for instance, the shortest distance between itself and the profile embedding (e.g., profile vector) of profile data 202.

In some embodiments, if the distance between vectors of multiple vector pairs is similar (e.g., the distance values between the vectors of each vector pair are all within a defined range), entity disambiguation system 102 can present a follow-up question to an entity (e.g., a human) to disambiguate a word entity used by the entity in a dialogue. For example, if the cosine distance between a pair of vectors (e.g., as calculated by dialogue management component 110 using the function $f$ (entity, word)) is similar (i.e., within a defined range) to the cosine distance between vectors of one or more other vector pairs, entity disambiguation system 102 (e.g., via dialogue management component 110, interface component 402, and/or learner component 502) can present a follow-up question to an entity (e.g., a human) asking the entity to select and/or confirm a word entity variation defined in a database of dialogue management component 110 that the entity intended to reference by using the word entity in the dialogue. For instance, dialogue management component 110 can present n number of top word entity variations (e.g., top ranked variations, best fit variations, etc.) having vector representations located at similar distances in a vector space with respect to a profile vector representation of profile data 202 and ask the entity to select the correct word entity variation to disambiguate the word entity. In some embodiments, dialogue management component 110 can present such n number of top word entity variations (e.g., top ranked variations, best fit variations, etc.), ask the entity to select the correct word entity variation, and/or receive feedback from the entity using an interface component of entity disambiguation system 102 (e.g., interface component 402 described below with reference to FIG. 4).

Figure 3:
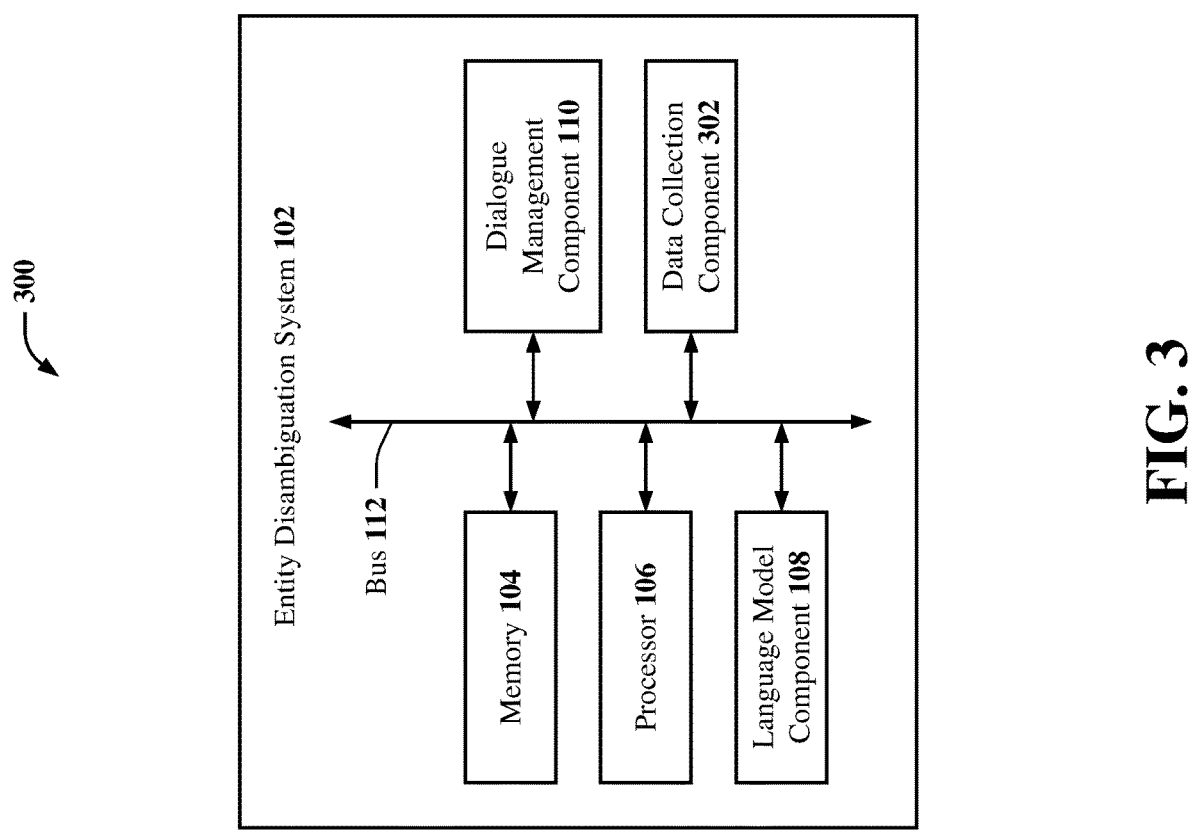
FIG. 3 illustrates a block diagram of an example, non-limiting system that can facilitate word entity disambiguation in accordance with one or more embodiments described herein.

FIG. 3 illustrates a block diagram of an example, non-limiting system 300 that can facilitate word entity disambiguation in accordance with one or more embodiments described herein. In some embodiments, system 300 can comprise entity disambiguation system 102. In some embodiments, entity disambiguation system 102 can comprise a data collection component 302. Repetitive description of like elements and/or processes employed in respective embodiments is omitted for sake of brevity.

According to multiple embodiments, data collection component 302 can collect profile data of the entity. For example, data collection component 302 can collect profile data corresponding to an entity such as, for instance, a human participating in a dialogue (e.g., a conversation between the entity and a conversation agent). In some embodiments, data collection component 302 can collect profile data corresponding to the entity including, but not limited to, entity age, entity country of residence, and/or other profile data corresponding to the entity. In some embodiments, data collection component 302 can collect such profile data corresponding to an entity from data sources including, but not limited to, the entity (e.g., answers from the entity answers to interview questions, input data from the entity, documents from the entity, etc.), a network (e.g., the Internet, an intranet of a company, a database, etc.), a server (e.g., a server of the entity, a third-party server, etc.), and/or another data source.

In some embodiments, data collection component 302 can collect one or more conversation logs comprising a dialogue, a word entity in the dialogue, and/or one or more contextual word entities adjacent to the word entity in the dialogue. For example, data collection component 302 can collect one or more conversation logs comprising a dialogue between, for instance, a first entity (e.g., a human) and a second entity (e.g., a conversation agent). In this example, data collection component 302 can further collect a word entity used by the first entity (e.g., the human) in the dialogue and/or one or more contextual word entities adjacent to the word entity in the dialogue. In some embodiments, data collection component 302 can collect data corresponding to such data (e.g., conversation log(s), dialogue, word entity, contextual word entities, etc.) from data sources including, but not limited to, the first and/or second entity (e.g., answers from the first and/or second entity to interview questions, input data from the first and/or second entity, documents from the first and/or second entity, etc.), a network (e.g., the Internet, an intranet of a company, a database, etc.), a server (e.g., a server of the first and/or second entity, a third-party server, etc.), and/or another data source.

In some embodiments, data collection component 302 can comprise and/or employ an artificial intelligence (AI) model and/or a machine learning (ML) model to collect (e.g., extract, annotate, etc.) such profile data and/or conversation log(s) described. In some embodiments, data collection component 302 can store (e.g., via processor 106) such collected data on a memory (e.g., memory 104) where it can be retrieved and/or used by any components of entity disambiguation system 102 (e.g., language model component 108, dialogue management component 110, interface component 402, learner component 502, etc.). For example, such data can be used by language model component 108 to generate a profile vector of an entity and/or a word vector of a word entity as described above with reference to FIGS. 1 and 2.

In some embodiments, data collection component 302 can comprise and/or employ an AI and/or a ML model including, but not limited to, a classification model, a probabilistic model, statistical-based model, an inference-based model, a deep learning model, a neural network, long short-term memory (LSTM), fuzzy logic, expert system, Bayesian model, and/or another model that can extract such data described above from such data sources. For example, data collection component 302 can comprise and/or employ an AI model that can utilize, for instance, long short-term memory (LSTM), a reasoning algorithm, natural language annotation, and/or natural language processing (NLP) to extract such data described above from such data sources. In some embodiments, data collection component 302 can collect such data described above from such data sources by executing read and/or write operations using processor 106 to read such data from a data source and/or write such data to a memory (e.g., memory 104) where it can be retrieved and/or used by any components of entity disambiguation system 102 (e.g., language model component 108, dialogue management component 110, interface component 402, learner component 502, etc.).

Figure 4:
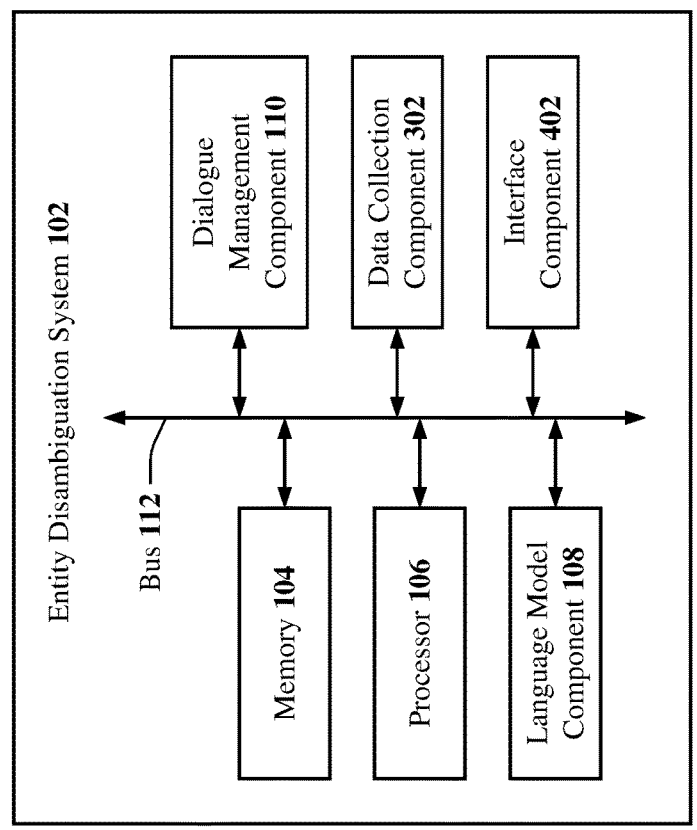
FIG. 4 illustrates a block diagram of an example, non-limiting system that can facilitate word entity disambiguation in accordance with one or more embodiments described herein.

FIG. 4 illustrates a block diagram of an example, non-limiting system 400 that can facilitate word entity disambiguation in accordance with one or more embodiments described herein. In some embodiments, system 400 can comprise entity disambiguation system 102. In some embodiments, entity disambiguation system 102 can comprise an interface component 402. Repetitive description of like elements and/or processes employed in respective embodiments is omitted for sake of brevity.

According to multiple embodiments, interface component 402 can present at least one of a word entity variation or a word entity disambiguation of a word entity and/or receive feedback data corresponding to at least one of the word entity variation or the word entity disambiguation. For example, interface component 402 can comprise an interface component including, but not limited to, an application programming interface (API), a graphical user interface (GUI), and/or another interface component that can present to an entity (e.g., via a computer monitor, a display, a screen, etc.) at least one of such a word entity variation or a word entity disambiguation of a word entity and/or receive feedback data from the entity corresponding to at least one of the word entity variation or the word entity disambiguation. For instance, interface component 402 can comprise an interface component that can present such information to an entity by displaying it on a computer monitor, for example, and/or can receive feedback data from the entity via one or more input controls of interface component 402 (e.g., input controls of a GUI) such as, for example, a text field, a button, a seek bar, a checkbox, a toggle button, a zoom button, and/or another input control.

Figure 5:
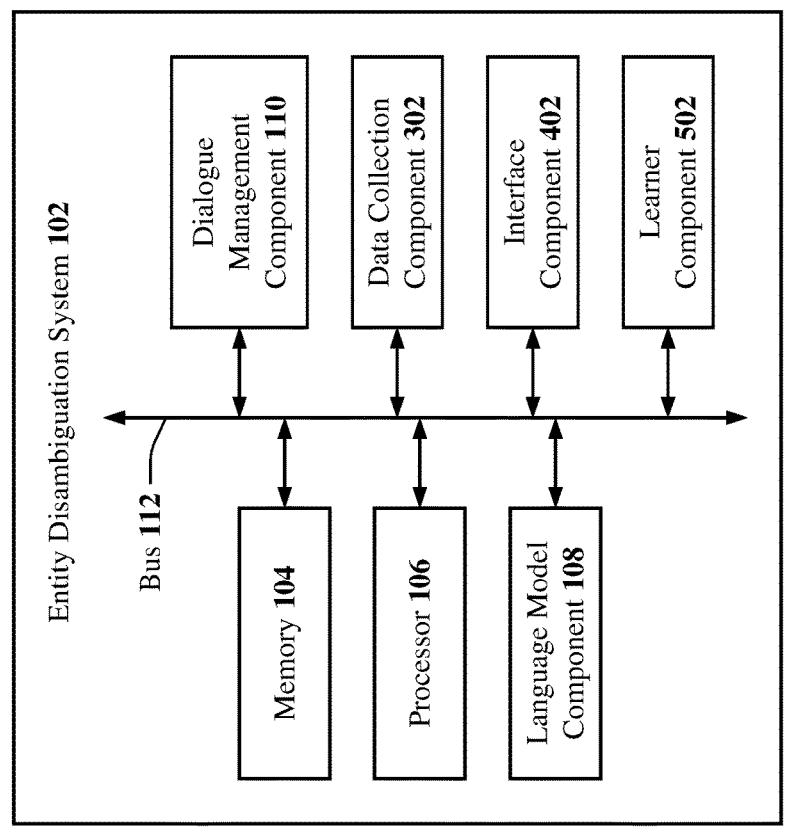
FIG. 5 illustrates a block diagram of an example, non-limiting system that can facilitate word entity disambiguation in accordance with one or more embodiments described herein.

FIG. 5 illustrates a block diagram of an example, non-limiting system 500 that can facilitate word entity disambiguation in accordance with one or more embodiments described herein. In some embodiments, system 500 can comprise entity disambiguation system 102. In some embodiments, entity disambiguation system 102 can comprise a learner component 502. Repetitive description of like elements and/or processes employed in respective embodiments is omitted for sake of brevity.

According to multiple embodiments, learner component 502 can learn one or more word entity variations of a word entity based on feedback data corresponding to at least one of a word entity variation or a word entity disambiguation of the word entity. For example, learner component 502 can learn one or more word entity variations of a word entity based on feedback data corresponding to a word entity variation and/or a word entity disambiguation of the word entity presented to an entity (e.g., a human) or based on feedback data comprising a new word entity variation not presented to the entity and/or not defined in such a database of dialogue management component 110 described above.

In some embodiments, based on such feedback data, learner component 502 can learn that in a certain dialogue (e.g., a conversation between a human and a conversation agent), where an entity (e.g., a human) used a certain word entity requiring disambiguation (e.g., "Windy city"), the entity intended a certain word entity variation (e.g., "Chicago," "Hsinchu," or a different word entity variation of "Windy city"). In some embodiments, learner component 502 can retrain one or more language models (e.g., model 200) utilized by entity disambiguation system 102 and/or components thereof (e.g., language model component 108, dialogue management component 110, etc.) based on such feedback data, which can constitute new training data.

In some embodiments, learner component 502 can learn a profile embedding and/or a word embedding of a model utilized by entity disambiguation system 102 and/or components thereof. For example, learner component 502 can learn a profile embedding (e.g., profile vector) corresponding to profile data 202 and/or a word embedding (e.g., word vector) corresponding to contextual word entities 204 of model 200 described above with reference to FIG. 2. In another example, learner component 502 can learn a combined embedding (e.g., combined vector) comprising a profile embedding (e.g., profile vector) corresponding to profile data 202 and/or a word embedding (e.g., word vector) corresponding to contextual word entities 204 of model 200 described above with reference to FIG. 2.

In some embodiments, learner component 502 can learn one or more parameters of model 200. For example, learner component 502 can learn one or more parameters of model 200 including, but not limited to, a numerical representation of profile data 202, a vector representation of profile data 202, one or more numerical representations of one or more contextual word entities 204 in a dialogue, one or more vector representations of one or more contextual word entities 204 in a dialogue, and/or another parameter of model 200.

In some embodiments, based on such feedback data described above, learner component 502 can learn (e.g., actively, continuously, and/or automatically without input from a human) one or more new word entity variations (e.g., new word entity variations not previously defined in a database of dialogue management component 110). For example, learner component 502 can learn such one or more new word entity variations based on training data that can include, but is not limited to: profile data of the entity (e.g., profile data 202); the word entity (e.g., target word entity); one or more contextual word entities adjacent to the word entity in a dialogue; the feedback data from the entity; and/or other training data.

In some embodiments, such feedback data received from an entity as described above can comprise historical data corresponding to an entity and/or a word entity used by the entity in a dialogue. In some embodiments, learner component 502 can compile such historical data into a historical data index (e.g., a log) that can be stored on a memory device such as, for instance, memory 104 and/or a remote memory device (e.g., a memory device of a remote server).

In some embodiments, such historical data can comprise training data that learner component 502 can use to learn one or more word entity variations (e.g., new word entity variations). For example, learner component 502 can comprise and/or employ one or more artificial intelligence (AI) models and/or one or more machine learning (ML) models to learn such one or more word entity variations (e.g., new word entity variations) based on explicit learning and/or implicit learning. For instance, learner component 502 can comprise and/or employ an AI model to learn such one or more word entity variations (e.g., new word entity variations) based on explicit learning (e.g., supervised learning, reinforcement learning, etc.), where such previously obtained historical data corresponding to the entity and/or a word entity used by the entity in a dialogue (e.g., data collected by data collection component 302 as described above) can be used by learner component 502 as training data to learn one or more word entity variations (e.g., new word entity variations). In another example, learner component 502 can comprise and/or employ an AI model to learn such one or more word entity variations (e.g., new word entity variations) based on implicit learning (e.g., unsupervised learning), where such feedback data received from the entity as described above can be used by learner component 502 as training data to learn one or more word entity variations (e.g., new word entity variations).

In an embodiment, learner component 502 can learn such one or more word entity variations (e.g., new word entity variations) based on classifications, correlations, inferences and/or expressions associated with principles of artificial intelligence. For instance, learner component 502 can employ an automatic classification system and/or an automatic classification process to learn one or more word entity variations (e.g., new word entity variations) based on feedback data received from the entity. In one embodiment, learner component 502 can employ a probabilistic and/or statistical-based analysis (e.g., factoring into the analysis utilities and costs) to learn one or more word entity variations (e.g., new word entity variations) based on feedback data received from the entity.

In some embodiments, learner component 502 can employ any suitable machine learning based techniques, statistical-based techniques, and/or probabilistic-based techniques to learn one or more word entity variations (e.g., new word entity variations) based on feedback data received from the entity. For example, learner component 502 can employ an expert system, fuzzy logic, support vector machine (SVM), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or another model. In some embodiments, learner component 502 can perform a set of machine learning computations associated with learning one or more word entity variations (e.g., new word entity variations) based on feedback data received from the entity. For example, learner component 502 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to learn one or more word entity variations (e.g., new word entity variations) based on feedback data received from the entity.

Figure 6:
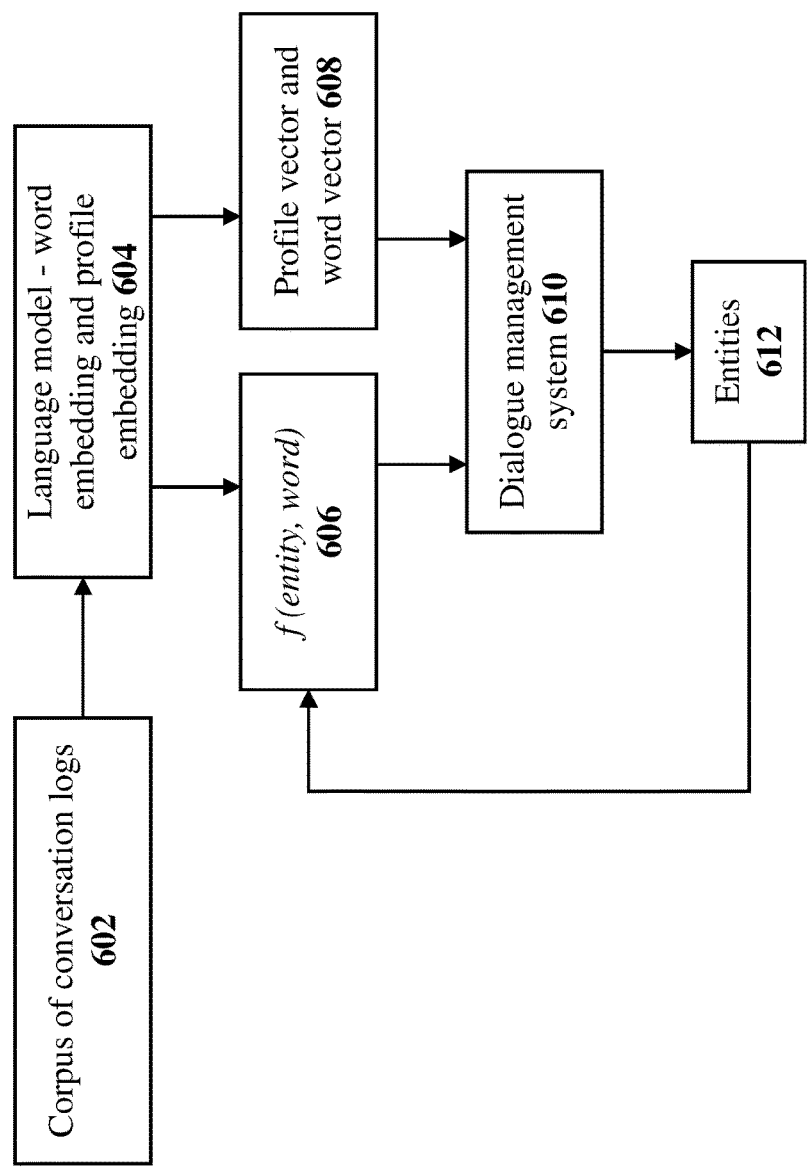
FIG. 6 illustrates a flow diagram of an example, non-limiting computer-implemented method that can facilitate word entity disambiguation in accordance with one or more embodiments described herein.

FIG. 6 illustrates a flow diagram of an example, non-limiting computer-implemented method 600 that can facilitate word entity disambiguation in accordance with one or more embodiments described herein. Repetitive description of like elements and/or processes employed in respective embodiments is omitted for sake of brevity.

In some embodiments, at 602, computer-implemented method 600 can comprise collecting one or more conversation logs (e.g., a corpus of conversation logs). For example, as described above with reference to FIG. 3, data collection component 302 can collect one or more conversation logs comprising a dialogue, a word entity in the dialogue, and/or one or more contextual word entities adjacent to the word entity in the dialogue.

In some embodiments, at 604, computer-implemented method 600 can comprise performing word embedding and profile embedding. For example, as described above with reference to FIGS. 1 and 2, language model component 108 can employ a language model such as, for instance, model 200 to perform such word embedding and profile embedding, where such word embedding can be completed based on one or more contextual word entities adjacent to a word entity in a dialogue and such profile embedding can be completed based profile data corresponding to an entity (e.g., a human) participating in a dialogue (e.g., a conversation between a human and a conversation agent).

In some embodiments, at 606, computer-implemented method 600 can comprise outputting (e.g., generating) a function $f$ (entity, word). For example, as described above with reference to FIGS. 1 and 2, language model component 108 can employ a language model such as, for instance, model 200 to output such a function $f$ (entity, word).

In some embodiments, at 608, computer-implemented method 600 can comprise outputting (e.g., generating) a profile vector and a word vector. For example, as described above with reference to FIGS. 1 and 2, language model component 108 can employ a language model such as, for instance, model 200 to output such a profile vector and a word vector (e.g., via performing profile embedding and word embedding, respectively).

In some embodiments, at 610, computer-implemented method 600 can comprise inputting to a dialogue management system (e.g., dialogue management component 110) the function $f$ (entity, word) of operation 606 and/or the profile vector and word vector of operation 608 to facilitate disambiguating a word entity (e.g., via dialogue management component 110). In some embodiments, at 610, computer-implemented method 600 can further comprise identifying (e.g., via dialogue management component 110) one or more word entity variations of a word entity needing disambiguation. For instance, as described above with reference to FIGS. 1 and 2, dialogue management component 110 can detect that a word entity defined as "Windy city" and used by an entity (e.g., a human) in a dialogue (e.g., a conversation between a human and a conversation agent) is mapped (e.g., in a database of dialogue management component 110) to a first word entity variation defined as "Chicago" in the United States of America and is also mapped to a second word entity variation defined as "Hsinchu" in Taiwan.

In some embodiments, at 612, computer-implemented method 600 can comprise inputting one or more word entity variation embeddings (e.g., word entity variation vector(s)) into the function $f$ (entity, word) of operation 606 to calculate the distance (e.g., cosine distance) between a profile embedding (e.g., profile vector) and each of such one or more word entity variation embeddings (e.g., word entity variation vectors). For example, as described above with reference to FIGS. 1 and 2, to disambiguate a word entity used by an entity in a dialogue, dialogue management component 110 can employ the function $f$ (entity, word) to calculate the distance (e.g., cosine distance) between a profile embedding comprising the profile vector of profile data 202 described above with reference to FIG. 2 and each of the word entity variation embeddings (e.g., word entity variation vectors) corresponding to the word entity variation "Chicago" and the word entity variation "Hsinchu" defined in a database of dialogue management component 110. In another example, to disambiguate a word entity used by an entity in a dialogue, dialogue management component 110 can employ the function $f$ (entity, word) to calculate the distance (e.g., cosine distance) between each of such word entity variation embeddings (e.g., word entity variation vectors) defined above and a profile embedding comprising a combined embedding (e.g., a combined vector comprising the profile vector of profile data 202 and the word vector of contextual word entities 204).

In some embodiments (not illustrated in FIG. 6), at 612, computer-implemented method 600 can further comprise presenting (e.g., via interface component 402) one or more word entity variations (e.g., "Chicago" and "Hsinchu") to an entity and/or receiving (e.g., interface component 402) feedback data corresponding to such one or more word entity variations. For example, if the distances calculated between such vector pairs defined above are similar (e.g., the distance values between the vectors of each vector pair are all within a defined range), entity disambiguation system 102 can present a follow-up question to an entity (e.g., a human) to disambiguate a word entity used by the entity in a dialogue. For instance, if the cosine distance between the pair of vectors comprising a profile vector defined above and the word entity variation vector corresponding to "Chicago" is similar (i.e., within a defined range) to the cosine distance between the pair of vectors comprising a profile vector defined above and the word entity variation vector corresponding to "Hsinchu," entity disambiguation system 102 (e.g., via dialogue management component 110, interface component 402, and/or learner component 502) can present the word entity variations "Chicago" and "Hsinchu" to an entity (e.g., a human) and ask the entity to select the word entity variation (e.g., "Chicago" or "Hsinchu") the entity intended to reference by using the word entity in the dialogue. In this example, the entity can select either "Chicago" or "Hsinchu," or provide (e.g., via interface component 402) a different (e.g., new) word variation entity not presented to the entity and/or not defined in such a database of dialogue management component 110 described above.

In some embodiments (not illustrated in FIG. 6), at 612, based on such feedback data received from the entity as described above, computer-implemented method 600 can further comprise learning one or more word entity variations of the word entity (e.g., "Chicago," "Hsinchu," or a different word entity variation of "Windy city"). For example, as described above with reference to FIG. 5, based on such feedback data, learner component 502 can learn that in a certain dialogue (e.g., a conversation between a human and a conversation agent), where an entity (e.g., a human) used a certain word entity requiring disambiguation (e.g., "Windy city"), the entity intended a certain word entity variation (e.g., "Chicago," "Hsinchu," or a different word entity variation of "Windy city"). In some embodiments (not illustrated in FIG. 6), at 612, if such feedback data comprises a word entity variation other than "Chicago" or "Hsinchu," computer-implemented method 600 can further comprise retraining (e.g., via learner component 502) the language model of operation 604 (e.g., language model component 108 and/or model 200) and/or the dialogue management system (e.g., dialogue management component 110 and/or model 200) based on such feedback data comprising a newly defined word entity variation.

In some embodiments, entity disambiguation system 102 can be associated with various technologies. For example, entity disambiguation system 102 can be associated with language model technologies, information retrieval technologies, information extraction technologies, entity disambiguation technologies, cognitive computing technologies, conversation agent technologies, data analytics technologies, graph analytics technologies, artificial intelligence technologies, machine learning technologies, computer technologies, server technologies, information technology (IT) technologies, internet-of-things (IoT) technologies, automation technologies, and/or other technologies.

In some embodiments, entity disambiguation system 102 can provide technical improvements to systems, devices, components, operational steps, and/or processing steps associated with the various technologies identified above. For example, entity disambiguation system 102 can automatically (e.g., without assistance from a human) disambiguate (e.g., via language model component 108, dialogue management component 110, model 200, etc.) a word entity used in a dialogue by an entity (e.g., a human) based on: profile data (e.g., profile data 202) corresponding the entity; one or more contextual word entities adjacent to the word entity in the dialogue (e.g., one or more contextual word entities 204); and/or feedback data received from the entity as described above with reference to FIGS. 5 and 6. In this example, by disambiguating a word entity in a dialogue based on such profile data, contextual word entities, and/or feedback data defined above, entity disambiguation system 102 can facilitate improved accuracy, efficiency, and/or performance of a dialogue management system (e.g., dialogue management component 110) that performs word entity disambiguation.

In some embodiments, entity disambiguation system 102 can provide technical improvements to a processing unit (e.g., processor 106) associated with a classical computing device and/or a quantum computing device (e.g., a quantum processor, quantum hardware, superconducting circuit, etc.). For example, as described above, by disambiguating a word entity in a dialogue based on such profile data, contextual word entities, and/or feedback data defined above, entity disambiguation system 102 can facilitate improved accuracy, efficiency, and/or performance of a dialogue management system (e.g., dialogue management component 110) that performs word entity disambiguation. In this example, by facilitating such improved accuracy, efficiency, and/or performance of a dialogue management system (e.g., dialogue management component 110) that performs word entity disambiguation, entity disambiguation system 102 can thereby facilitate improved accuracy, efficiency, and/or performance of a processing unit (e.g., processor 106) associated with such a dialogue management system (e.g., dialogue management component 110).

In some embodiments, entity disambiguation system 102 can employ hardware or software to solve problems that are highly technical in nature, that are not abstract and that cannot be performed as a set of mental acts by a human In some embodiments, some of the processes described herein can be performed by one or more specialized computers (e.g., one or more specialized processing units, a specialized quantum computer, etc.) for carrying out defined tasks related to the various technologies identified above. In some embodiments, entity disambiguation system 102 and/or components thereof, can be employed to solve new problems that arise through advancements in technologies mentioned above, employment of quantum computing systems, cloud computing systems, computer architecture, and/or another technology.

It is to be appreciated that entity disambiguation system 102 can utilize various combinations of electrical components, mechanical components, and circuitry that cannot be replicated in the mind of a human or performed by a human, as the various operations that can be executed by entity disambiguation system 102 and/or components thereof as described herein are operations that are greater than the capability of a human mind. For instance, the amount of data processed, the speed of processing such data, or the types of data processed by entity disambiguation system 102 over a certain period of time can be greater, faster, or different than the amount, speed, or data type that can be processed by a human mind over the same period of time.

According to several embodiments, entity disambiguation system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that entity disambiguation system 102 can include information that is impossible to obtain manually by an entity, such as a human user. For example, the type, amount, or variety of information included in entity disambiguation system 102, language model component 108, dialogue management component 110, model 200, data collection component 302, interface component 402, and/or learner component 502 can be more complex than information obtained manually by a human user.

Figure 7:
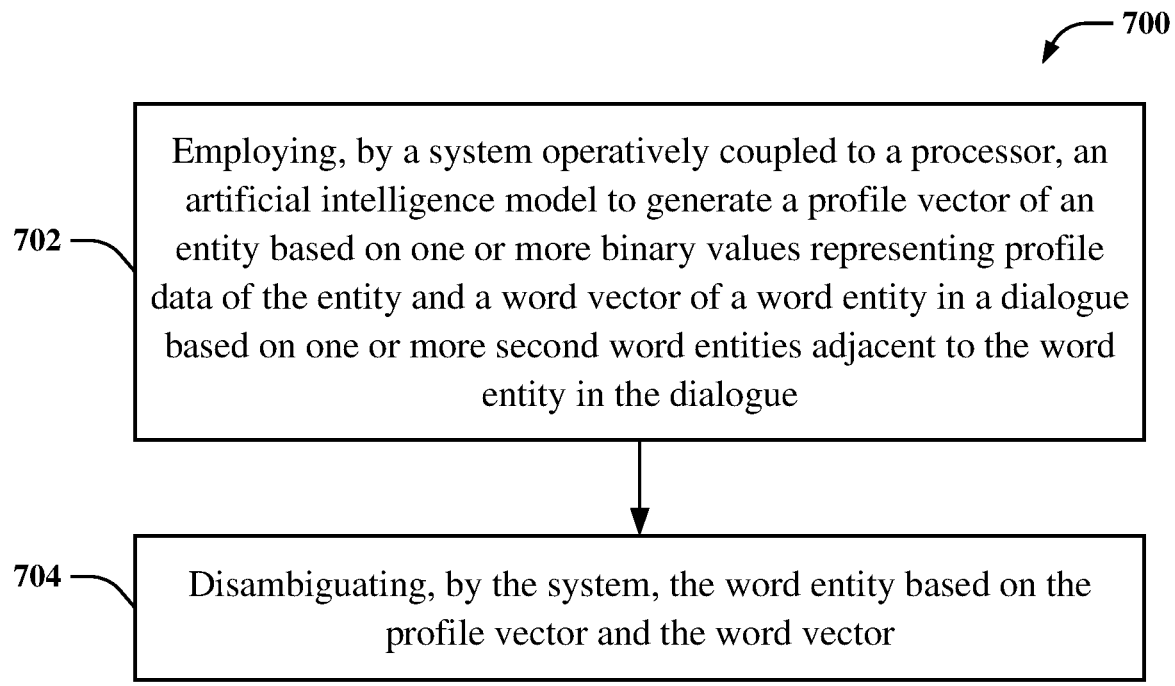
FIG. 7 illustrates a flow diagram of an example, non-limiting computer-implemented method that can facilitate word entity disambiguation in accordance with one or more embodiments described herein.

FIG. 7 illustrates a flow diagram of an example, non-limiting computer-implemented method 700 that can facilitate word entity disambiguation in accordance with one or more embodiments described herein. Repetitive description of like elements and/or processes employed in respective embodiments is omitted for sake of brevity.

In some embodiments, at 702, computer-implemented method 700 can comprise employing, by a system (e.g., via entity disambiguation system 102 and/or language model component 108) operatively coupled to a processor (e.g., processor 106), an artificial intelligence model (e.g., model 200) to generate a profile vector of an entity (e.g., a human) based on one or more binary values representing profile data of the entity (e.g., entity age, entity country of residence, etc.) and a word vector of a word entity (e.g., a target word entity) in a dialogue (e.g., a conversation between a human and a conversation agent) based on one or more second word entities (e.g., contextual word entities 204) adjacent to the word entity in the dialogue.

In some embodiments, at 704, computer-implemented method 700 can comprise disambiguating, by the system (e.g., via entity disambiguation system 102 and/or dialogue management component 110), the word entity based on the profile vector and the word vector.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
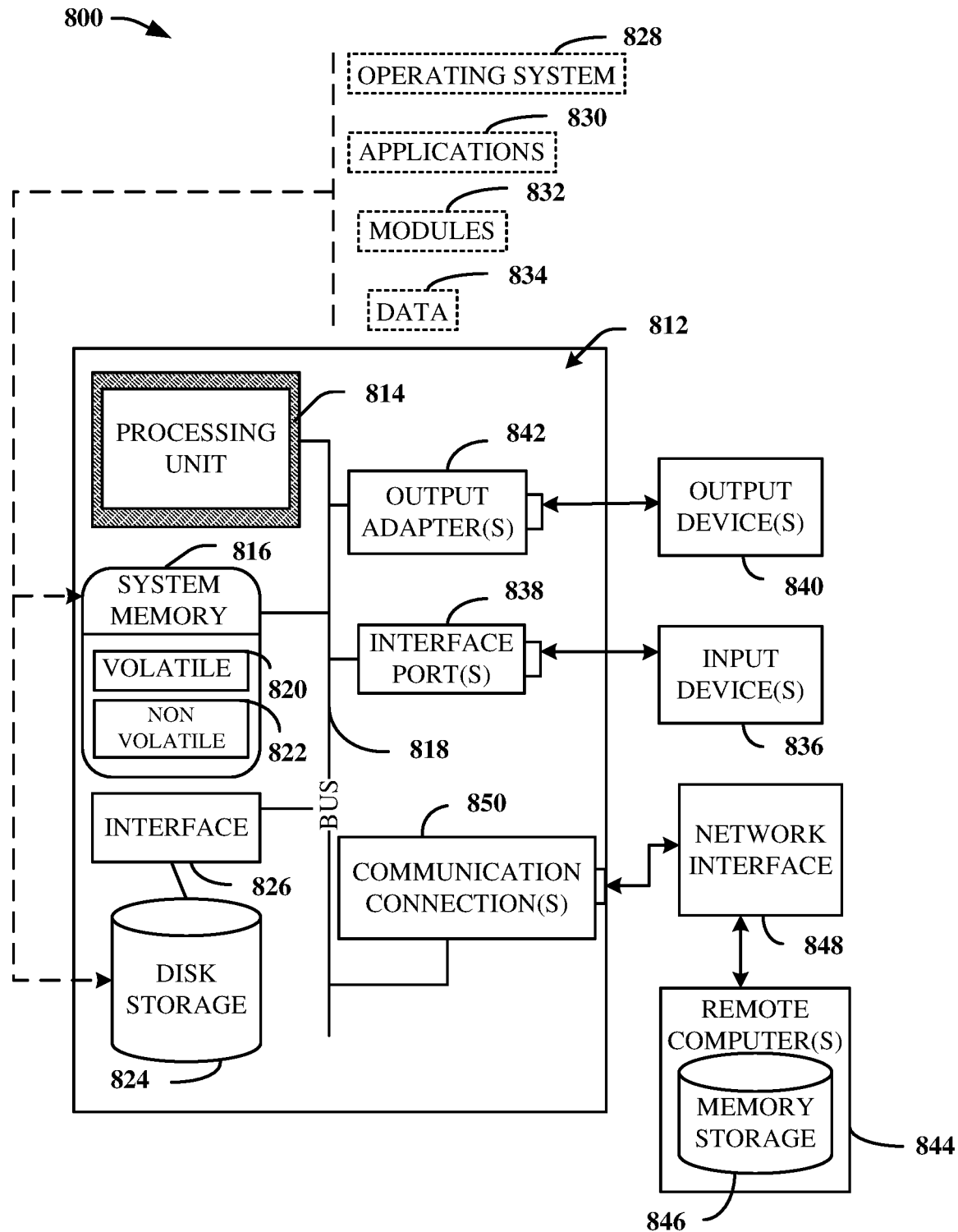
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
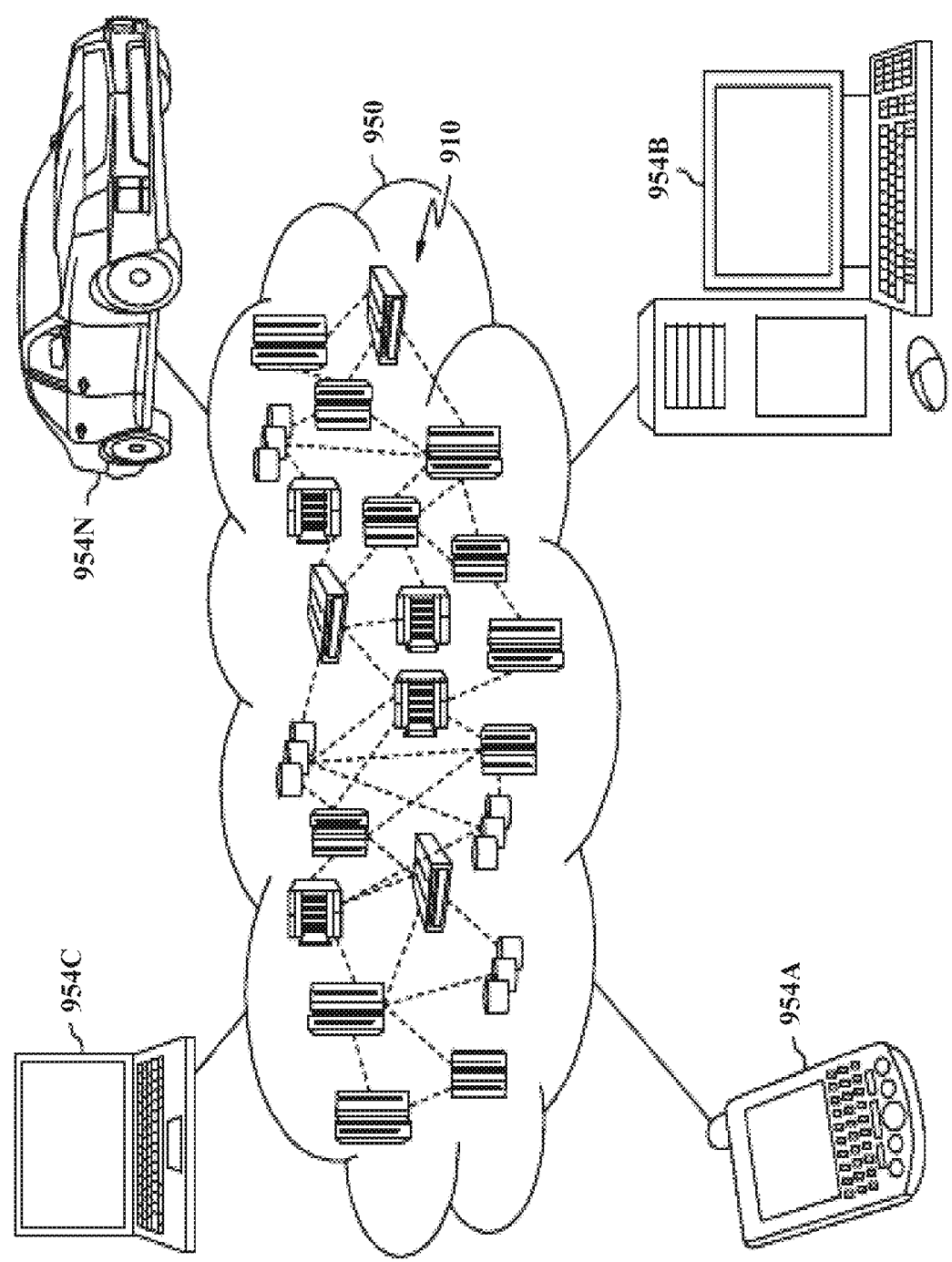
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
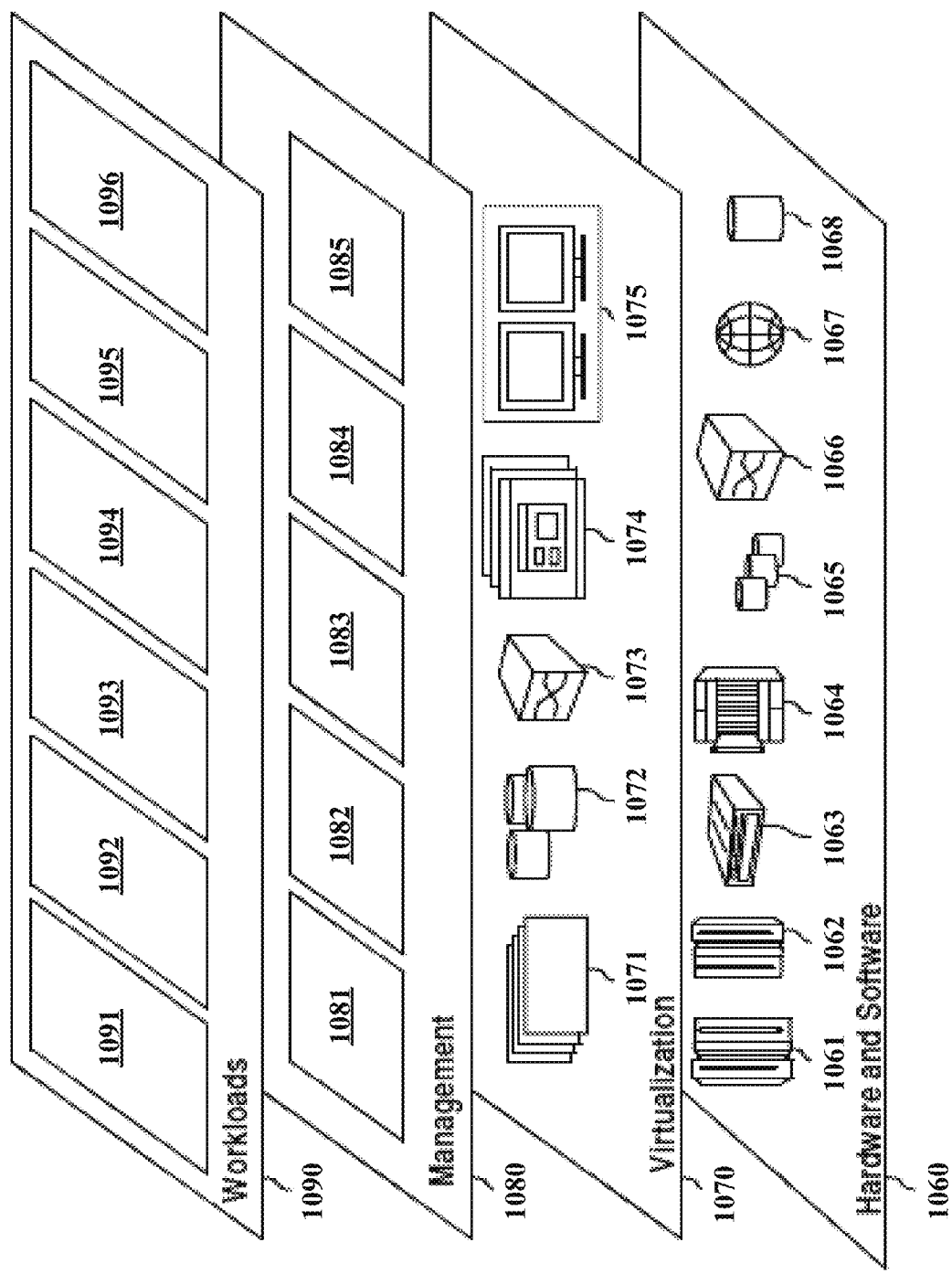
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and entity disambiguation software 1096.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
   a language model component that employs an artificial intelligence model to generate:
   a profile vector of a human entity based on one or more binary values representing profile data of the human entity,
   a first word vector of a word entity in a dialogue based on one or more second word entities adjacent to the word entity in the dialogue, wherein the dialogue is between the human entity and a conversation agent,
   a second word vector of the one or more second word entities, a third word vector of a combination of the profile vector and the second word vector of one or more second word entities, a fourth word vector of a word entity variation defined in a database, and a function that describes one or more mathematical relationships between the profile vector and the first word vector of the word entity in the dialogue, the second word vector of one or more second word entities, the third word vector of the combination of the profile vector and the second word vector of one or more second word entities, and the fourth word vector of the word entity variation; and a dialogue management component that employs the function to disambiguate the word entity based on the profile vector and the first word vector of the word entity in the dialogue, the second word vector of one or more second word entities, the third word vector of the combination of the profile vector and the second word vector of one or more second word entities, and the fourth word vector of the word entity variation.

2. The system of claim 1, wherein the computer executable components further comprise:

a data collection component that collects at least one of the profile data of the human entity or one or more conversation logs comprising at least one of the dialogue, the word entity, or the one or more second word entities.

3. The system of claim 1, wherein the artificial intelligence model comprises at least one of a language model, a document to vector model, a word to vector model, a natural language model, a term vector model, a vector space model, a natural language processing model, a statistical language model, or a feature learning model.

4. The system of claim 1, wherein the word entity comprises one or more textual objects selected from a group consisting of a phoneme, a syllable, a letter, a word, a sentence, and a paragraph.

5. The system of claim 1, wherein the dialogue comprises at least one of a sequence of word entities, a sequence of textual objects, a textual dialogue, a textual conversation, or a corpus of conversation log data.

6. The system of claim 1, wherein the computer executable components further comprise:

an interface component that presents at least one of the word entity variation or a word entity disambiguation of the word entity and receives feedback data corresponding to at least one of the word entity variation or the word entity disambiguation.

7. The system of claim 1, wherein the computer executable components further comprise:

a learner component that learns one or more word entity variations of the word entity based on feedback data corresponding to at least one of the word entity variation or a word entity disambiguation of the word entity, thereby facilitating at least one of improved accuracy, efficiency, or performance of at least one of the dialogue management component or the processor.

8. A computer-implemented method, comprising:

employing, by a system operatively coupled to a processor, an artificial intelligence model to generate:

a profile vector of a human entity based on one or more binary values representing profile data of the human entity, a first word vector of a word entity in a dialogue based on one or more second word entities adjacent to the word entity in the dialogue, wherein the dialogue is between the human entity and a conversation agent, a second word vector of the one or more second word entities, a third word vector of a combination of the profile vector and the second word vector of one or more second word entities, a fourth word vector of a word entity variation defined in a database, and a function that describes one or more mathematical relationships between the profile vector and the first word vector of the word entity in the dialogue, the second word vector of one or more second word entities, the third word vector of the combination of the profile vector and the second word vector of one or more second word entities, and the fourth word vector of the word entity variation; and disambiguating, by the system using the function, the word entity based on the profile vector and the first word vector of the word entity in the dialogue, the second word vector of one or more second word entities, the third word vector of the combination of the profile vector and the second word vector of one or more second word entities, and the fourth word vector of the word entity variation.

9. The computer-implemented method of claim 8, further comprising:

collecting, by the system, at least one of the profile data of the human entity or one or more conversation logs comprising at least one of the dialogue, the word entity, or the one or more second word entities.

10. The computer-implemented method of claim 8, wherein the employing comprises:

employing, by the system, at least one of a language model, a document to vector model, a word to vector model, a natural language model, a term vector model, a vector space model, a natural language processing model, a statistical language model, or a feature learning model to generate the profile vector of the human entity based on the one or more binary values representing the profile data of the human entity and the first word vector of the word entity in the dialogue based on the one or more second word entities adjacent to the word entity in the dialogue.

11. The computer-implemented method of claim 8, further comprising:

presenting, by the system, at least one of the word entity variation or a word entity disambiguation of the word entity; and receiving, by the system, feedback data corresponding to at least one of the word entity variation or the word entity disambiguation.

12. The computer-implemented method of claim 8, further comprising:

learning, by the system, one or more word entity variations of the word entity based on feedback data corresponding to at least one of the word entity variation or a word entity disambiguation of the word entity, thereby facilitating at least one of improved accuracy, efficiency, or performance of at least one of the system or the processor.

13. The computer-implemented method of claim 8, wherein the word entity comprises one or more textual objects selected from a group consisting of a phoneme, a syllable, a letter, a word, a sentence, and a paragraph.

14. A computer program product facilitating word entity disambiguation, the computer program product comprising a computer readable storage medium having program instructions embodied therewith, the program instructions executable by a processor to cause the processor to:

employ, by the processor, an artificial intelligence model to generate:

a profile vector of a human entity based on one or more binary values representing profile data of the human entity, a first word vector of a word entity in a dialogue based on one or more second word entities adjacent to the word entity in the dialogue, wherein the dialogue is between the human entity and a conversation agent, a second word vector of the one or more second word entities, a third word vector of a combination of the profile vector and the second word vector of one or more second word entities, a fourth word vector of a word entity variation defined in a database, and a function that describes one or more mathematical relationships between the profile vector and the first word vector of the word entity in the dialogue, the second word vector of one or more second word entities, the third word vector of the combination of the profile vector and the second word vector of one or more second word entities, and the fourth word vector of the word entity variation; and disambiguate, by the processor using the function, the word entity based on the profile vector and the first word vector of the word entity in the dialogue, the second word vector of one or more second word entities, the third word vector of the combination of the profile vector and the second word vector of one or more second word entities, and the fourth word vector of the word entity variation.

15. The computer program product of claim 14, wherein the program instructions are further executable by the processor to cause the processor to:

collect, by the processor, at least one of the profile data of the human entity or one or more conversation logs comprising at least one of the dialogue, the word entity, or the one or more second word entities.

16. The computer program product of claim 14, wherein the program instructions are further executable by the processor to cause the processor to:

employ, by the processor, at least one of a language model, a document to vector model, a word to vector model, a natural language model, a term vector model, a vector space model, a natural language processing model, a statistical language model, or a feature learning model to generate the profile vector of the human entity based on the one or more binary values representing the profile data of the human entity and the first word vector of the word entity in the dialogue based on the one or more second word entities adjacent to the word entity in the dialogue.

17. The computer program product of claim 14, wherein the program instructions are further executable by the processor to cause the processor to:

present, by the processor, at least one of the word entity variation or a word entity disambiguation of the word entity; and receive, by the processor, feedback data corresponding to at least one of the word entity variation or the word entity disambiguation.

18. The computer program product of claim 14, wherein the program instructions are further executable by the processor to cause the processor to:

learn, by the processor, one or more word entity variations of the word entity based on feedback data corresponding to at least one of the word entity variation or a word entity disambiguation of the word entity.

19. The computer program product of claim 14, wherein the word entity comprises one or more textual objects selected from a group consisting of a phoneme, a syllable, a letter, a word, a sentence, and a paragraph.

20. The computer program product of claim 14, wherein the dialogue comprises at least one of a sequence of word entities, a sequence of textual objects, a textual dialogue, a textual conversation, or a corpus of conversation log data.

* * * * *